(12) United States Patent
Jutamulia et al.

(10) Patent No.: US 10,437,120 B1
(45) Date of Patent: Oct. 8, 2019

(54) METHODS AND SYSTEMS FOR DISPLAYING HIGH DYNAMIC RANGE IMAGES

(71) Applicant: OmniVision Technologies, Inc., Santa Clara, CA (US)

(72) Inventors: Suganda Jutamulia, Berkeley, CA (US); Lequn Liu, San Jose, CA (US); Kenny Geng, Mountain View, CA (US); Guannho Tsau, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 25 days.

(21) Appl. No.: 15/960,376

(22) Filed: Apr. 23, 2018

(51) Int. Cl.
*G02F 1/1347* (2006.01)
*G09G 3/36* (2006.01)
*G02F 1/1335* (2006.01)
*G09G 3/20* (2006.01)

(52) U.S. Cl.
CPC ...... *G02F 1/1347* (2013.01); *G02F 1/133528* (2013.01); *G09G 3/2007* (2013.01); *G09G 3/36* (2013.01); *G02F 2001/13355* (2013.01); *G09G 2300/023* (2013.01)

(58) Field of Classification Search
CPC combination set(s) only.
See application file for complete search history.

(56) References Cited

U.S. PATENT DOCUMENTS

| 7,728,896 B2 | 6/2010 | McKee | |
| 8,686,339 B2 | 4/2014 | Mabuchi | |
| 9,041,838 B2 | 5/2015 | Bechtel et al. | |
| 9,911,773 B2 | 6/2018 | Yang et al. | |
| 10,009,551 B1* | 6/2018 | Adcock | H04N 5/247 |
| 2015/0116525 A1* | 4/2015 | Peng | G06T 5/50 |
| | | | 348/218.1 |
| 2016/0351102 A1* | 12/2016 | Shin | G09G 3/2007 |
| 2018/0007327 A1 | 1/2018 | Richards et al. | |
| 2018/0176438 A1* | 6/2018 | Brubaker | G06T 5/50 |

OTHER PUBLICATIONS

S. Mann and R. W. Picard, "On being 'undigital' with digital cameras: Extending dynamic range by combining differently exposed pictures," Proceedings of IS&T, 1995, pp. 442-448.
M. D. Grossberg and S. K. Nayar, "High dynamic range from multiple images: Which exposures to combined?," Proceedings of IEEE Workshop on Color and Photometric Methods in Computer Vision, Oct. 2003, pp. 1-8.

* cited by examiner

*Primary Examiner* — Robin J Mishler

(57) ABSTRACT

A display system comprises a first display for providing a first value and a second display for providing a second value. The displayed image is a product of multiplication of the first value provided by the first display and the second value provided by the second display. The first display is a transmissive display comprises: a first glass substrate, an unpatterned ITO layer, a LC layer, a patterned ITO layer having isolated electrodes, and a second glass substrate. The second display is a reflective LCOS comprises: a glass substrate, an unpatterned ITO layer, a LC layer, a metal electrode layer, and a silicon substrate.

20 Claims, 8 Drawing Sheets

METHODS AND SYSTEMS FOR DISPLAYING HIGH DYNAMIC RANGE IMAGES

FIELD OF THE INVENTION

This invention relates to displaying high dynamic range (HDR) images, and more specifically relates to methods and systems for displaying HDR images using LCOS display.

BACKGROUND OF THE INVENTION

Image sensors including CMOS image sensor have a limited native dynamic range. A real scene may include dark portion and bright portion. If the sensor is adjusted to the dark portion, the captured image may include a dark portion that has recognizable details and a bright portion that is overexposed and thus is not recognizable. If the sensor is adjusted to the bright portion, the captured image may include a bright portion that has recognizable details and a dark portion that is underexposed and thus is not recognizable.

A high dynamic range (HDR) image may show both the dark portion having recognizable details and the bright portion having recognizable details. However, the current HDR techniques may not genuinely display the real scene that includes dark portion and bright portion in the real intensity scale. In HDR images, the intensity of dark portion is increased to include it in the lower end of the native dynamic range and the intensity of bright portion is decreased to include it in the higher end of the native dynamic range. Therefore, although both dark portion and bright portion have recognizable details, the dark portion and the bright portion may not be in real intensity scale.

Accordingly, methods and systems capable of capturing and displaying HDR images showing recognizable details in both dark portion and bright portion in a real intensity scale are demanded. The methods and systems capable of capturing and displaying HDR images of the present invention use the same image sensor and the same display having the same native dynamic ranges as that used in the current HDR techniques.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
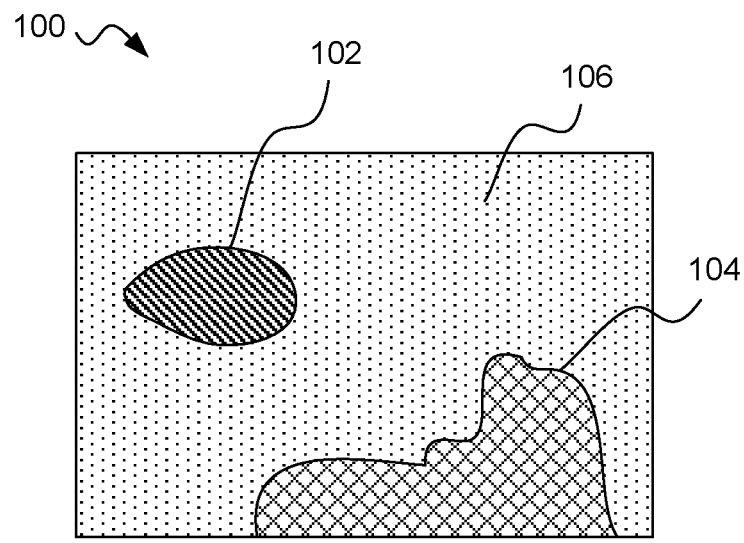
FIG. 1 schematically shows a method for capturing HDR image using an image sensor, according to an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

The image captured by an image sensor typically has a limited number of grey levels. Pixel is the smallest element of an image. The number of grey levels is defined by the number of bits per pixel. For example, if a pixel has 8 bits to represent its value, the number of grey levels will be $2^8$ or 256. In other words, the image has 256 different shades of gray. The grey level value of the pixel is proportional to the intensity of the image at the pixel.

For simplicity, in the disclosure, it is assumed that the image sensor has a native number of grey levels 256. Similarly, it is assumed that the display has the same native number of grey levels 256. It is appreciated that the image sensor may have any number of grey levels and the display may also have any number of grey levels. The number of grey levels of the image sensor is not necessarily the same as the number of grey levels of the display. The assumption of 256 grey levels is not associated with the disclosed principle of the operation.

FIG. 1 schematically shows a method for capturing HDR image using an image sensor, according to an embodiment of the present invention. The image sensor may be a CMOS image sensor, a CCD image sensor, or the like. The image sensor captures a first image 100. For example, first image 100 has 256 grey levels. First image 100 comprises an area 102, an area 104, and an area 106. For example, area 102 is statistically darker than area 104, and area 104 is statistically darker than area 106. Area 102 may include pixels having intensity value higher than the average intensity of area 104, but the average intensity of area 102 is lower than the average intensity of area 104. Similarly, the average intensity of area 104 is lower than the average intensity of area 106. Area 102, area 104, and area 106 may be defined using image processing algorithms. For example, image processing algorithms are described in U.S. patent application Ser. No. 15/865,880, filed on Jan. 9, 2018, which is assigned to the same assignee.

Although image 100 has 256 grey levels, pixels in area 102 may have less grey levels, for example, 0-9 grey level values. Thus the details of area 102 cannot be properly captured and later displayed. If the gain of image 100 is increased, such that pixels in area 102 may have 0-255 grey level values, pixels in area 104 or 106 may be overexposed, such that the details of area 104 or 106 cannot be captured and later displayed.

The image sensor consecutively captures a second image. In the second image, area 102, area 104, and area 106 are captured using different gains. Each gain is determined based on some statistical features of the corresponding areas, for example, the average intensity. The gain may be proportional to the integration time. For example, the control of the integration time of each pixel is described in U.S. Pat. No. 9,041,838 to Bechtel et al.

In the second image (not shown), area 102, area 104, and area 106 are captured using different gains, e.g., G1, G2, and G3. Area 102 may have 256 grey levels instead of 0-9 grey level values. Similarly, area 104 and area 106 may have 256 grey levels, respectively. Accordingly, the details of all area 102, area 104, and area 106 can be properly captured and later displayed. Pixels at the transition between two areas may be assigned with a gain that gradually changes between two gains.

After capturing the second image, the grey level values, e.g., 0-255, and the gains, e.g., G1, G2, and G3, of each pixel are properly stored in the memory. The real scale intensity of each pixel may be represented by the multiplication of the grey level value and 1/G, where G is the gain of the pixel. In this way, a HDR image showing a real scene that has an actual number of grey levels larger than the native number of grey levels of the image sensor, e.g., 256, can be captured and stored in the memory.

It is appreciated that image 100 may include two or more areas having different average intensities. Accordingly, two or more gains may be used in the image capturing process.

Figure 2:
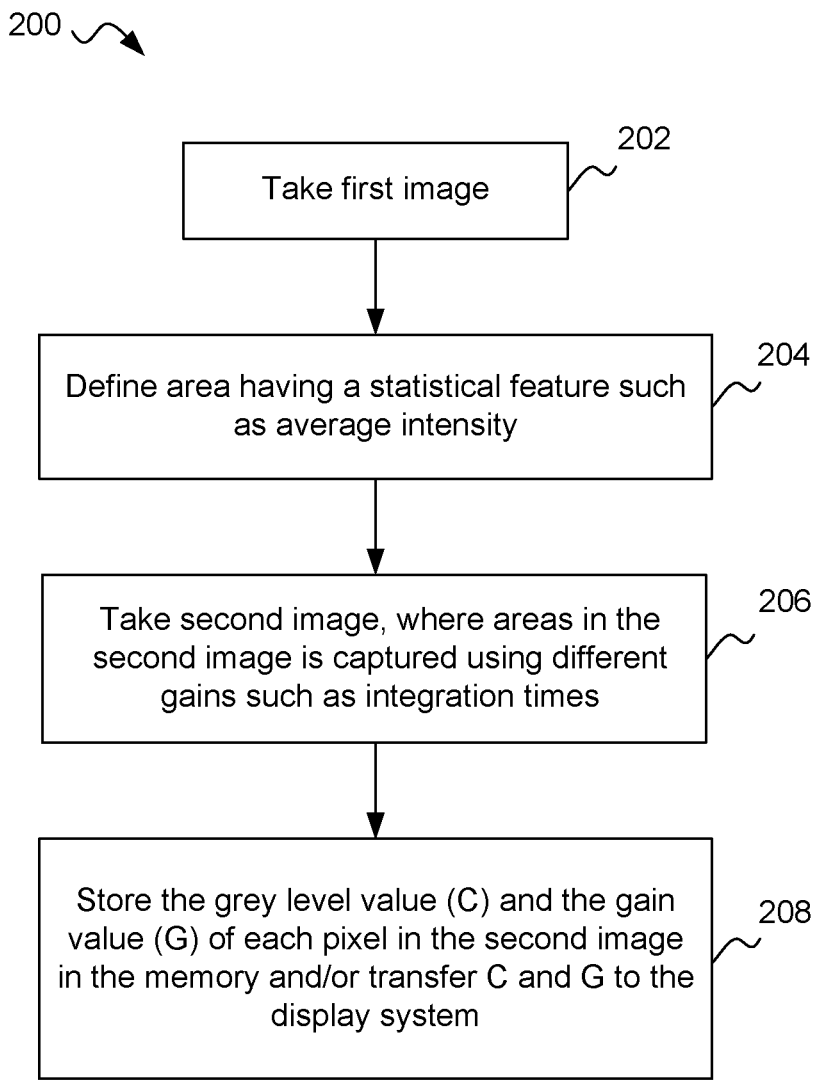
FIG. 2 shows a flowchart of a method for capturing HDR image, according to an embodiment of the present invention.

FIG. 2 shows a flowchart 200 of a method of capturing HDR image, according to an embodiment of the present invention. In step 202, a first image is taken. In step 204, the first image is divided into at least two areas, the divided areas are defined based on statistical features such as average intensities. In step 206, a second image is taken, where the areas in the second image are captured using different gains such as integration times. In step 208, the grey level values and the gain values of each pixel in the second image is stored in the memory and/or transferred to the display system. In this way, the number of actual grey levels of a pixel is larger than the native number of grey levels of the pixel, e.g., 256. Each actual grey level is the multiplication of the captured grey level and 1/G, where G is the gain.

Figure 3:
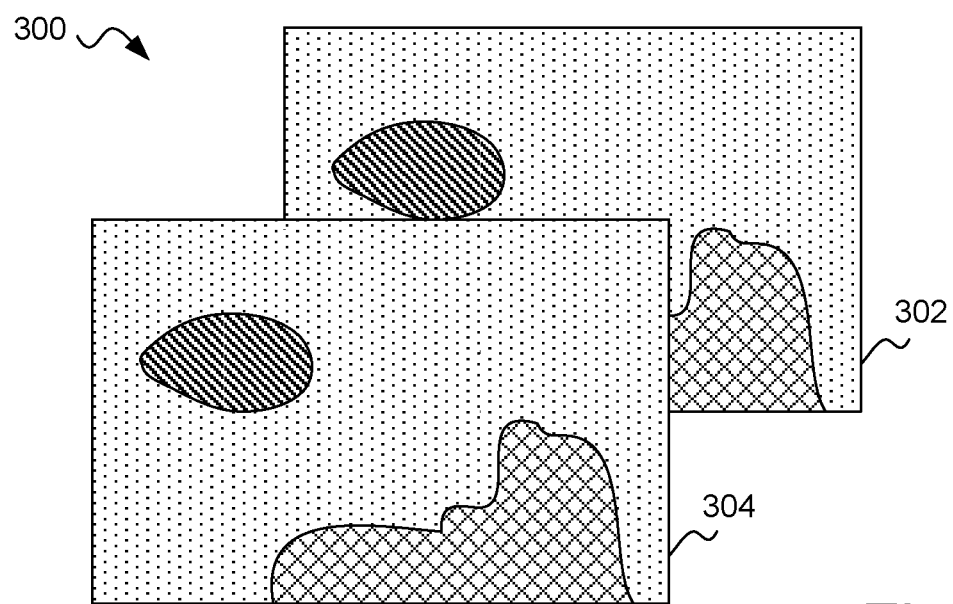
FIG. 3 schematically shows a display system for displaying the captured HDR images, according to an embodiment of the present invention.

FIG. 3 schematically shows a display system 300 for displaying the captured HDR images, according to an embodiment of the present invention. Display system 300 comprises a first display 302 and a second display 304. First display 302 displays the 1/G value and second display 304 displays the grey level value. The combination of first display 302 and second display 304 produces the displayed intensity value, which is the multiplication of the grey level value and 1/G value. In this way, the combined displayed number of grey levels of a pixel is larger than the native number of grey levels of the display, e.g., 256. Each grey level displayed is the multiplication of the captured grey level and 1/G.

Figure 4:
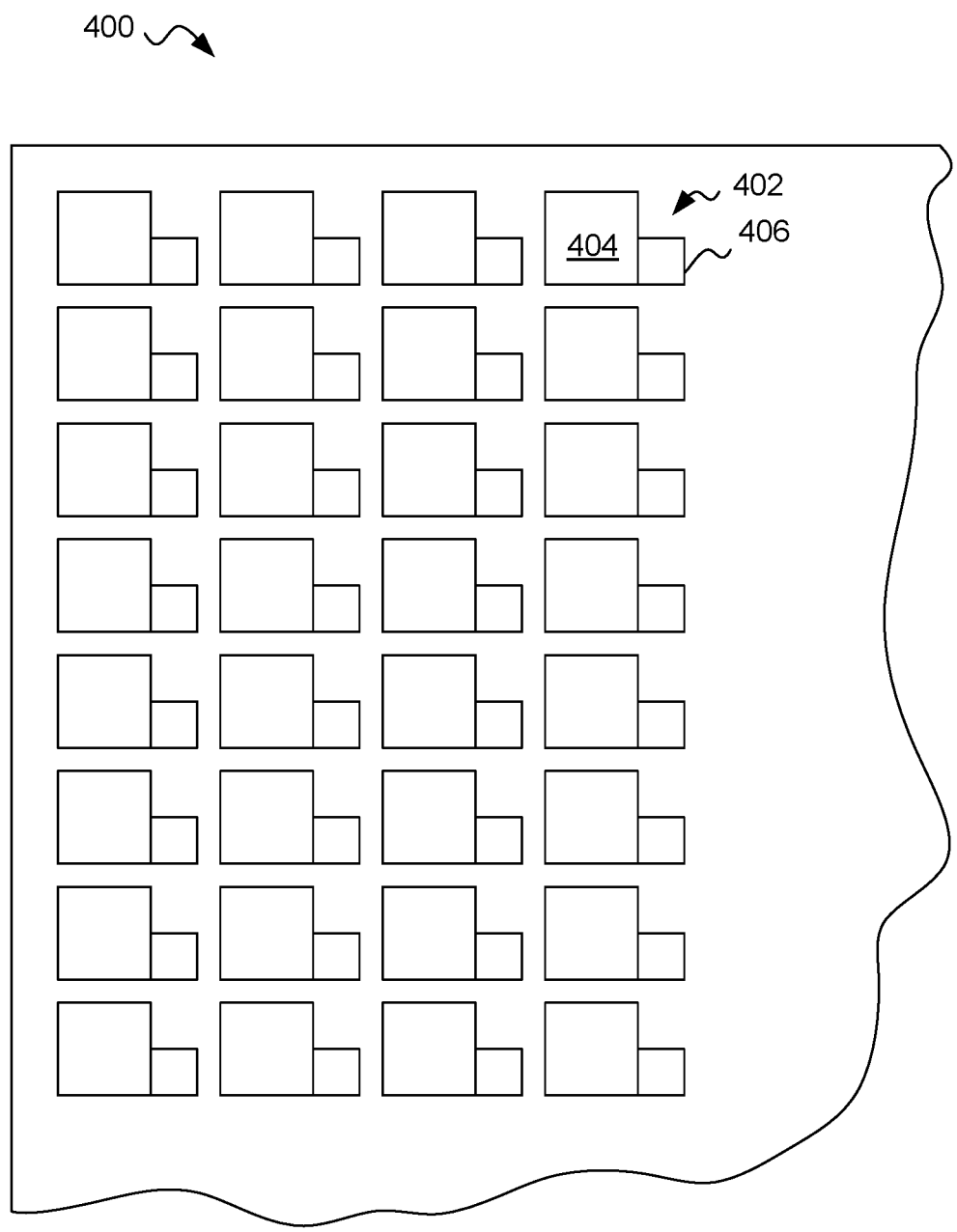
FIG. 4 shows an image sensor having large and small pixels for capturing HDR image.

FIG. 4 shows another method for capturing high dynamic range (HDR) image using an image sensor, according to an embodiment of the present invention. An image sensor 400 has a plurality of pixel pairs 402. Each pixel pair comprises a large area pixel 404 and a small area pixel 406. Large area pixel 404 has higher gain and small area pixel 406 has lower gain. Large area pixel 404 and small area pixel 406 are isolated from each other. For example, an embodiment of image sensor having large-small pixels is disclosed in U.S. Pat. No. 9,911,773 to Yang et al. Accordingly, image sensor 400 captures two images. First image A from large area pixels 404 and second image B from small area pixels 406. Intuitively, a HDR image will show image A in the dark portion of the image, and will show image B in the bright portion of the image. Because, in the dark portion of the HDR image, image B having lower gain will be underexposed, and in the bright portion of the HDR image, image A having higher gain will be overexposed.

Alternatively, a pixel has two selectable gains are provided by the corresponding circuit. The image sensor captures two images consecutively. First image A from pixels having larger gain and second image B from pixels having smaller gain. For example, an embodiment of image sensor comprising pixels having two selectable gains provided by the corresponding circuit is described in U.S. patent application Ser. No. 15/485,534, filed on Apr. 12, 2017, which is assigned to the same assignee.

S. Mann and R. W. Picard described a method for combining image A having high gain and image B having low gain in the paper entitled "On being 'undigital' with digital cameras: Extending dynamic range by combining differently exposed pictures," in Proceedings of IS&T, 1995, pp. 442-448. Mann and Picard disclosed to compute a weighted average of image A and image B. For example, the HDR combined image C may be expressed:

$$C = \frac{\alpha A + \beta B}{\alpha + \beta}. \qquad (1)$$

Coefficients $\alpha$ and $\beta$ are determined using an algorithm. A is the grey level value at the pixel having high gain, and B is the grey level value of the pixel having low gain. For example, algorithms are discussed by M. D. Grossberg and S. K. Nayar in the paper entitled "High dynamic range from multiple images: Which exposures to combine?", in Proceedings of IEEE Workshop on Color and Photometric Methods in Computer Vision (CPMCV), October 2003, pp. 1-8. In an extreme cases, $\alpha=0$ for pixels in the bright portion of the HDR image, and $\beta=0$ for pixels in the dark portion of the HDR image. For transition pixels between dark portion and bright portion, neither a nor P is zero. Both A and B have grey level values 0-255, accordingly the combined image C also has grey level values 0-255.

The actual grey level values of A is proportional to the captured grey level of A having 0-255 grey levels multiplied by $1/G_A$, and the actual grey level values of B is proportional to the captured grey level of B having 0-255 grey levels multiplied by $1/G_B$, where $G_A$ and $G_B$ are gains of image A and image B, respectively. The actual grey level values of combined image C may be calculated using the actual grey level values of A and the actual grey level values of B, and the values of a and P. The resulting actual grey level value of C may be expressed by the combined grey level value of C having 0-255 grey levels given in Eq. (1) multiplied by 1/G, where G is an effective gain of the HDR combined image C. Note that each pixel has its own G, which may be the same as or different from other pixels.

One may calculate:

$$C' = \frac{\alpha A' + \beta B'}{\alpha + \beta}, \quad (2)$$

where $$A' = A \times \frac{1}{G_A} \text{ and } B' = B \times \frac{1}{G_B}, \quad (3)$$

and $$C' = C \times \frac{1}{G}. \quad (4)$$

Since C is given by Eq. (1), G may be obtained.

Figure 5:
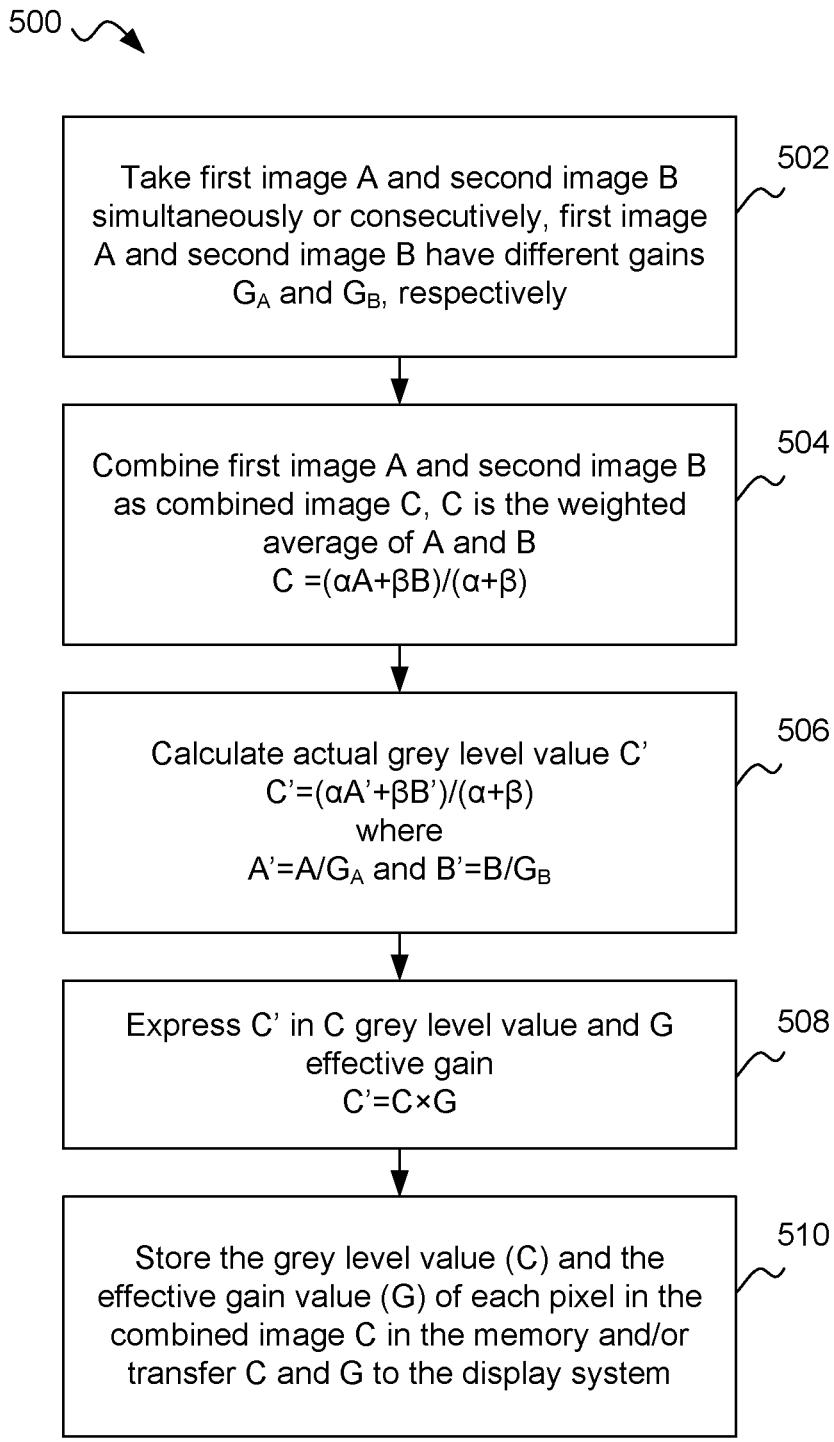
FIG. 5 shows a flowchart of a method for capturing a HDR image, according to an embodiment of the present invention.

FIG. 5 shows a flowchart 500 of another method of capturing a HDR image, according to an embodiment of the present invention. In step 502, a first image A and a second image B are taken simultaneously or consecutively. First image A and second image B are captured using different gains $G_A$ and $G_B$, respectively. In step 504, first image A and second image B are combined as the combined image C. The grey level value C is the weighted average of the grey level value A and the grey level value B. In step 506, the actual grey level value C' is calculated as the weighted average of the actual grey level value A', which is the multiplication of the grey level value A and $1/G_A$, and the actual grey level value B', which is the multiplication of the grey level value B and $1/G_B$. In step 508, the actual grey level value C' is expressed by the multiplication of C, which is the grey level value of the combined image C, and 1/G, where G is the effective gain of the pixel. In step 510, the grey level values and the effective gain values of each pixel in the combined image is stored in the memory and/or transferred to the display system. In this way, the number of actual grey levels of a pixel is larger than the native number of grey levels of the pixel, e.g., 256. Each actual grey level value of the pixel is the multiplication of the grey level value C and 1/G, G is the effective gain.

To summarize, a first display provides 1/G value, and a second display provides a grey level value. The HDR image produced is a product of multiplication of 1/G value provided by the first display and the grey level value provided by the second display. The grey level value may be a grey level value of a combined image from two images captured with two different gains. The grey level value may also be a grey level value of an integrated image formed by at least two areas in the integrated image captured with respective different gains. The gain may be an effective gain calculated from the two images captured with two different gains. The gain may also be a gain of a corresponding area in the integrated image. The grey level value of the combined image is a weighted average of grey level values of the two images captured with two different gains. In an embodiment, the 1/G value may be any value, for example, a first value, and the grey level value may be any value, for example, a second value.

Figure 6:
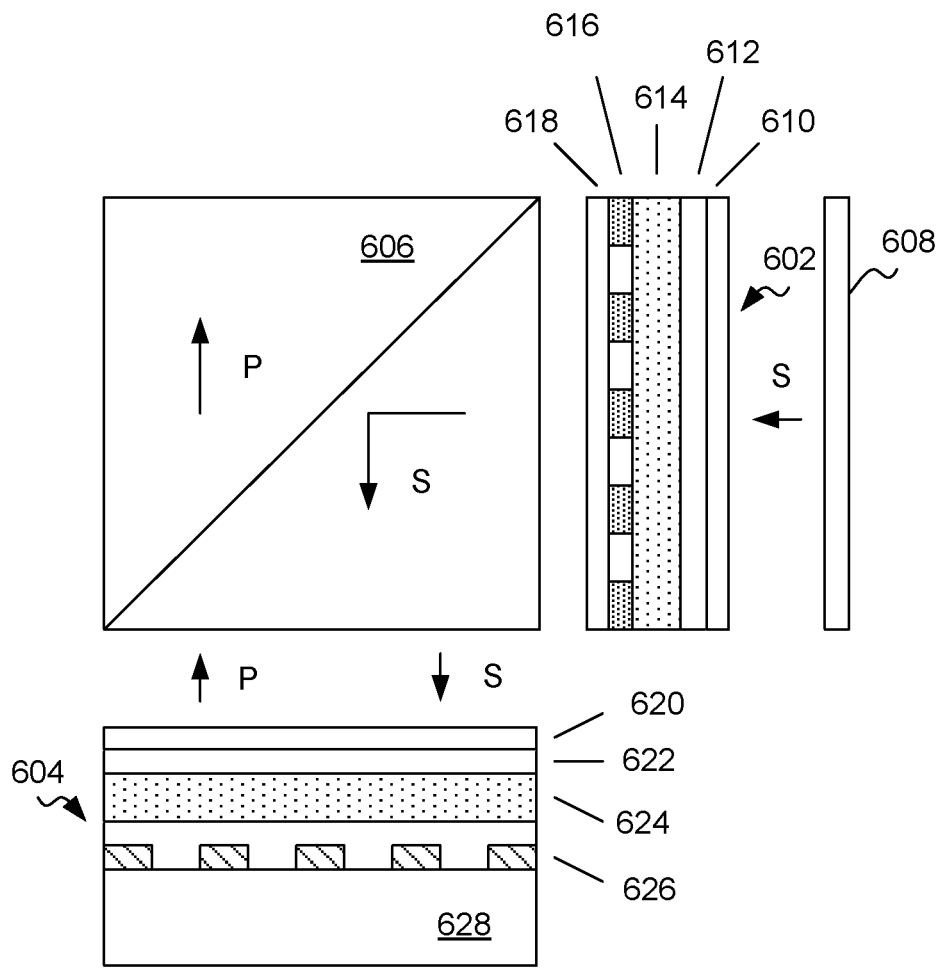
FIG. 6 shows an exemplary embodiment of the display system according to the present invention.

FIG. 6 shows an exemplary embodiment of the display system 600 in accordance to the invention. Display system 600 comprises a first display 602 and a second display 604. First display 602 and second display 604 are optically coupled by a polarizing beam splitter (PBS) 606. First display 602 may be a transmissive liquid crystal display (LCD) comprising a first glass substrate 610, an unpatterned indium tin oxide (ITO) layer 612, a liquid crystal (LC) layer 614, a patterned ITO layer having isolated electrodes 616, and a second glass substrate 618. Second display 604 may be a reflective liquid crystal on silicon (LCOS) comprising a glass substrate 620, an unpatterned ITO layer 622, a LC layer 624, a metal electrode layer 626, and a silicon substrate 628.

Unpolarized light from a light source (not shown) passes through a polarizer, for example a S-polarizer 608, so that the light is S-polarized. The S-polarized light passes through and is modulated by first display 602. The modulated light has S-polarized part and P-polarized part because some S-polarized part is rotated or partially rotated by first display 602. LC layer 614 is configured to rotate the S-polarized to P-polarized for a pixel value of 0 or lowest value, and to remain S-polarized for a pixel value of, for example, 255 or highest value. The modulated light by first display 602 enters PBS 606. The S-polarized part is reflected to second display 604 and the P-polarized part is transmitted through PBS 606 unused. The S-polarized part reflected to second display 604 is intensity modulated by first display 602. First display 602 displays 1/G, thus the intensity of the S-polarized part is proportional to 1/G.

The S-polarized part passes glass substrate 620, unpatterned ITO layer 622, LC layer 624, and is reflected by metal electrode layer 626 to reverse passing LC layer 624, unpatterned ITO layer 622, and glass substrate 620, leaving second display 604. LC layer 624 is configured to rotate the S-polarized to P-polarized for a pixel value of, for example, 255 or highest value, and to remain S-polarized for a pixel value of 0 or lowest value. Light leaving second display 604 enters PBS 606. The P-polarized part transmits through PBS 606, and the S-polarized part is reflected to first display 602 direction, which is unused. The display image produced after P-polarized part transmitted through PBS 606 is the multiplication of 0-255 grey level values displayed by second display 604 and 1/G displayed by first display 602. Accordingly, a HDR image having more than 256 grey levels can be displayed.

In this way, unpolarized light passes through the polarizer, passes through the first display, is reflected by the PBS, enters and is reflected by the second display, and is transmitted through the PBS in a serial order.

Figure 7:
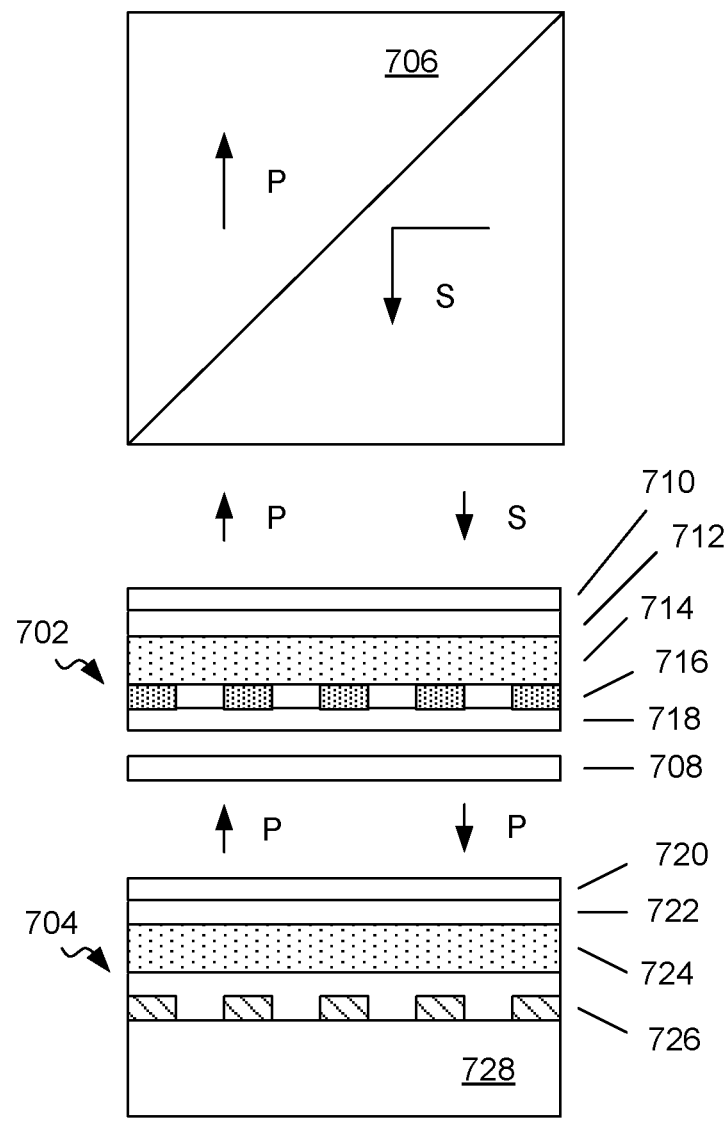
FIG. 7 shows another exemplary embodiment of the display system according to the present invention.

FIG. 7 shows another exemplary embodiment of the display system 700 in accordance with the invention. Display system 700 comprises a first display 702 and a second display 704. First display 702 may be a transmissive LCD comprising a first glass substrate 710, an unpatterned ITO layer 712, a LC layer 714, a patterned ITO layer having isolated electrodes 716, and a second glass substrate 718. Second display 704 may be a reflective LCOS comprising a glass substrate 720, an unpatterned ITO layer 722, LC layer 724, a metal electrode layer 726, and a silicon substrate 728.

Unpolarized light from a light source (not shown) enters a PBS 706. The S-polarized part of light is reflected to first display 702 and the P-polarized part of light is transmitted through PBS 706 unused. The S-polarized light passes through and is modulated by first display 702. The modulated light has S-polarized part and P-polarized part because some S-polarized part is rotated or partially rotated by first display 702. LC layer 714 is configured to rotate the S-polarized to 45°-polarized for a pixel value of, for example, 255 or highest value, and to remain S-polarized for a pixel value of 0 or lowest value. The modulated light by first display 702 passes through a P-polarizer 708. First display 702 displays $1/\sqrt{G}$, thus the intensity of the P-polarized part is proportional to $1/\sqrt{G}$.

The P-polarized part passes glass substrate 720, unpatterned ITO layer 722, LC layer 724, and is reflected by metal electrode layer 726 to reverse passing LC layer 724, unpatterned ITO layer 722, and glass substrate 720, leaving second display 704. LC layer 724 is configured to rotate the P-polarized to S-polarized for a pixel value of 0 or lowest value, and to remain P-polarized for a pixel value of, for example, 255 or highest value. Light leaving second display 704 passes through P-polarizer 708 and enters first display 702.

Light leaving second display 704 passes through first display 702 for the second time. The P-polarized light passes through and is modulated by first display 702. The modulated light has S-polarized part and P-polarized part because some P-polarized part is rotated or partially rotated by first display 702. Since LC layer 714 is configured to rotate the polarization by 45° in forward direction, LC layer 714 rotates the polarization by −45° in reverse direction. LC layer 714 rotates the P-polarized to 45°-polarized for a pixel value of, for example, 255 or highest value, and to remain P-polarized for a pixel value of 0 or lowest value.

The twice modulated light by first display 702 enters PBS 706, which transmits the P-polarized part and reflects the S-polarized part unused. First display 702 displays $1/\sqrt{G}$, thus the intensity of the P-polarized part after passing P-polarizer 708 is proportional to $1/\sqrt{G}$. The resultant modulation of twice modulation of first display 702 is proportional to $1/\sqrt{G} \times 1/\sqrt{G}$ or $1/G$. The display image produced after P-polarized part transmitted through PBS 706 is the multiplication of 0-255 grey level values displayed by second display 704 and $1/G$ modulated by first display 702. Accordingly, a HDR image having more than 256 grey levels can be displayed.

In this way, unpolarized light is reflected by the PBS, passes through the first display in forward direction, passes through the polarizer, enters and is reflected by the second display, passes through the polarizer for the second time, passes through the first display in backward direction, and is transmitted through the PBS in a serial order.

Figure 8:
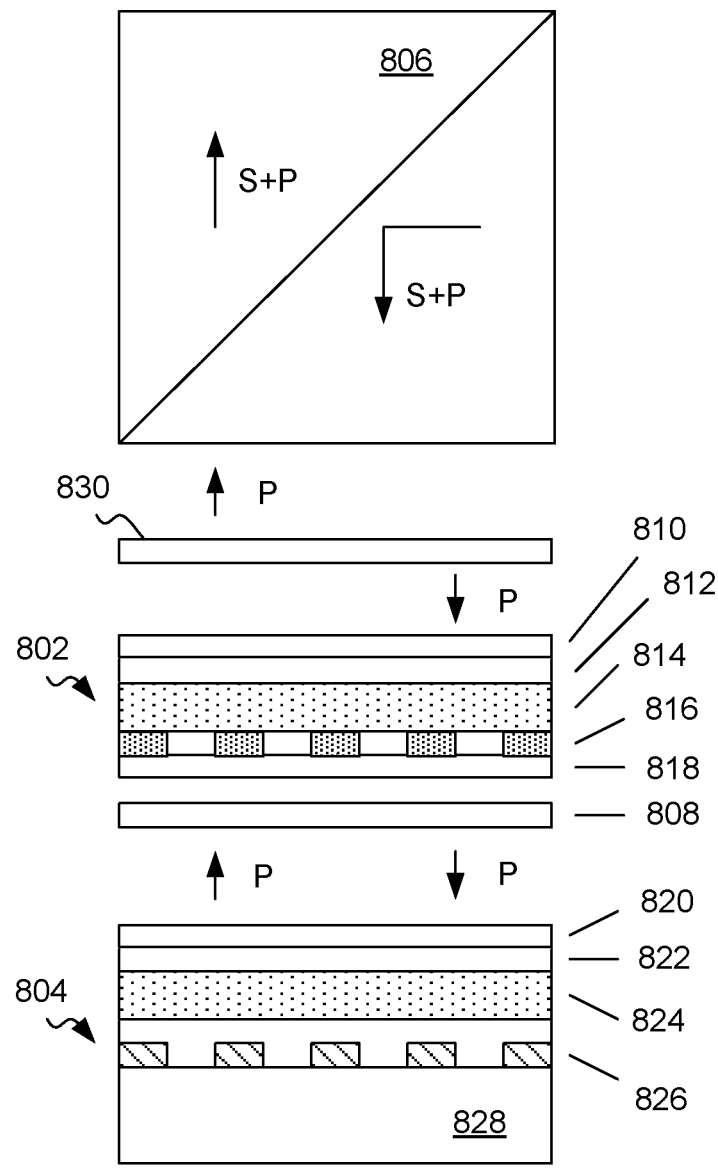
FIG. 8 shows a further another exemplary embodiment of the display system according to the present invention.

FIG. 8 shows further another exemplary embodiment of the display system 800 in accordance to the invention. Display system 800 comprises a first display 802 and a second display 804. First display 802 may be a transmissive LCD comprising a first glass substrate 810, an unpatterned ITO layer 812, a LC layer 814, a patterned ITO layer having isolated electrodes 816, and a second glass substrate 818. Second display 804 may be a reflective LCOS comprising a glass substrate 820, an unpatterned ITO layer 822, LC layer 824, a metal electrode layer 826, and a silicon substrate 828.

Unpolarized light from a light source (not shown) enters a non-polarizing BS 806. Half of the unpolarized light is reflected to first display 802 and half of the unpolarized light is transmitted through BS 806 unused. The P-polarized part of the reflected unpolarized light passes through a P-polarizer 830. The P-polarized light passes through and is modulated by first display 802. The modulated light has P-polarized part and S-polarized part because some P-polarized part is rotated or partially rotated by first display 802. LC layer 814 is configured to rotate the P-polarized to S-polarized for a pixel value of 0 or lowest value, and to remain P-polarized for a pixel value of, for example, 255 or highest value. The modulated light by first display 802 passes through a P-polarizer 808. First display 802 displays $1/\sqrt{G}$, thus the intensity of the P-polarized part is proportional to $1/\sqrt{G}$.

The P-polarized part passes glass substrate 820, unpatterned ITO layer 822, LC layer 824, and is reflected by metal electrode layer 826 to reverse passing LC layer 824, unpatterned ITO layer 822, and glass substrate 820, leaving second display 804. LC layer 824 is configured to rotate the P-polarized to S-polarized for a pixel value of 0 or lowest value, and to remain P-polarized for a pixel value of, for example, 255 or highest value. Light leaving second display 804 passes through P-polarizer 808 and enters first display 802.

Light leaving second display 804 passes through first display 802 for the second time. The P-polarized light passes through and is modulated by first display 802. The modulated light has S-polarized part and P-polarized part because some P-polarized part is rotated or partially rotated by first display 802. Since LC layer 814 is configured to rotate the P-polarized to S-polarized in forward direction, LC layer 814 rotates the S-polarized to P-polarized, which is the same as rotating the P-polarized to S-polarized, in reverse direction. For forward and reverse direction, LC layer 814 similarly rotates the P-polarized to S-polarized for a pixel value of 0 or lowest value, and to remain P-polarized for a pixel value of, for example, 255 or highest value.

The twice modulated light by first display 802 passes through P-polarizer 830 for the second time. First display 802 displays $1/\sqrt{G}$, thus the intensity of the P-polarized part after passing P-polarizer 808 is proportional to $1/\sqrt{G}$. The resultant modulation of twice modulation of first display 802 is $1/\sqrt{G} \times 1/\sqrt{G}$ or $1/G$. The display image produced passing P-polarizer 830 is the multiplication of 0-255 grey level values displayed by second display 804 and $1/G$ modulated by first display 802. Half of the produces image transmits through BS 806. Accordingly, a HDR image having more than 256 grey levels can be displayed.

In this way, unpolarized light is reflected by the BS, passes through the first polarizer, passes through the first display in forward direction, passes through the second polarizer, enters and is reflected by the second display, passes through the second polarizer for the second time, passes through the first display in backward direction, passes through the first polarizer for second time, and is transmitted through the BS in a serial order.

Figure 9:
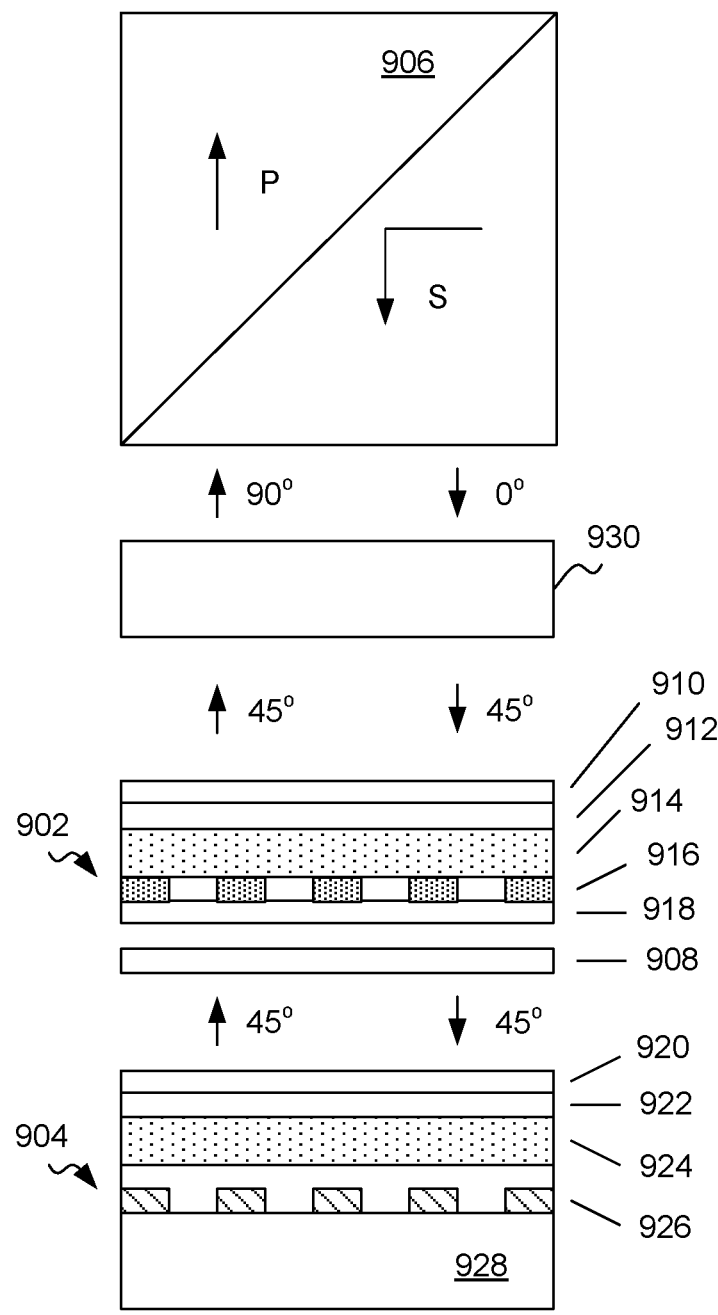
FIG. 9 shows a yet further another exemplary embodiment of the display system according to the present invention.

FIG. 9 shows yet further another exemplary embodiment of the display system 900 in accordance to the invention. Display system 900 comprises a first display 902 and a second display 904. First display 902 may be a transmissive LCD comprising a first glass substrate 910, an unpatterned ITO layer 912, a LC layer 914, a patterned ITO layer having isolated electrodes 916, and a second glass substrate 918. Second display 904 may be a reflective LCOS comprising a glass substrate 920, an unpatterned ITO layer 922, LC layer 924, a metal electrode layer 926, and a silicon substrate 928.

Unpolarized light from a light source (not shown) enters a PBS 906. The S-polarized part of light is reflected to a Faraday rotator 930 and the P-polarized part of light is transmitted through PBS 906 unused. The polarization of the S-polarized light, which has 0° polarization, is rotated by Faraday rotator 930 by 45°. The polarization of P-polarized light is 90° polarization. The 45° polarized light passes through and is modulated by first display 902. The modulated light has 45° polarized part and −45° polarized part because some 45° polarized part is rotated or partially rotated by first display 902. LC layer 914 is configures to rotate the 45° polarized to −45° polarized for a pixel value of 0 or lowest value, and to remain 45° polarized for a pixel value of, for example, 255 or highest value. The modulated light by first display 902 passes through a 45° polarizer 908. First display 902 displays $1/\sqrt{G}$, thus the intensity of the 45° polarized part after passing 45° polarizer 908 is proportional to $1/\sqrt{G}$.

The 45° polarized part passes glass substrate 920, unpatterned ITO layer 922, LC layer 924, and is reflected by metal electrode layer 926 to reverse passing LC layer 924, unpatterned ITO layer 922, and glass substrate 920, leaving second display 904. LC layer 924 is configured to rotate the 45° polarized to −45° polarized for a pixel value of 0 or lowest value, and to remain 45° polarized for a pixel value, for example, 255 or highest value. Light leaving second display 904 passes through 45° polarizer 908 and enters first display 902.

Light after passing through 45° polarizer further passes through first display 902 for the second time. The 45° polarized light passes through and is modulated by first display 902. The modulated light has 45° polarized part and −45° polarized part because some 45° polarized part is rotated or partially rotated by first display 902. Since LC layer 914 is configured to rotate the 45° polarized to −45° polarized in forward direction, LC layer 914 rotates the −45° polarized to 45° polarized, which is the same as rotating 45° polarized to −45° polarized in reverse direction. For forward and reverse direction, LC layer 914 similarly rotates the 45° polarized to −45° polarized for a pixel value of 0 or lowest value, and to remain 45° polarized for a pixel value of, for example, 255 or highest value.

The twice modulated light by first display 902 passes through Faraday rotator 930 for the second time. Different from a LC layer that rotates the polarization γ in forward direction and rotates the polarization −γ in reverse direction, a Faraday rotator rotates the polarization γ in both forward and reverse directions. Accordingly, 45° polarized light becomes 90° polarized light, which is P-polarized light, after passing Faraday rotator 930. The P-polarized light enters and transmits through PBS 906 providing a display image. PBS 906 reflects S-polarized light unused.

First display 902 displays $1/\sqrt{G}$, thus the intensity of the 45°-polarized part after passing 45° polarizer 908 is proportional to $1/\sqrt{G}$. The resultant modulation of twice modulation of first display 902 is $1/\sqrt{G} \times 1/\sqrt{G}$ or $1/G$. The display image produced passing PBS 906 is the multiplication of 0-255 grey level values displayed by second display 904 and $1/G$ modulated by first display 902. Accordingly, a HDR image having more than 256 grey levels can be displayed.

In this way, unpolarized light is reflected by the PBS, passes through the Faraday rotator, passes through the first display in forward direction, passes through the polarizer, enters and is reflected by the second display, passes through the polarizer for the second time, passes through the first display in backward direction, passes through the Faraday rotator for second time, and is transmitted through the PBS in a serial order.

It is appreciated that the grey level value may be replaced by a first value, and the $1/G$ value may be replaced by a second value. The first and second values may be any values. The displayed image is a product of multiplication of the first value and the second value.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A display system for displaying a high dynamics range (HDR) image comprising:
    a first display for providing a $1/G$ value, wherein G is a gain; and
    a second display for providing a grey level value;
    wherein the HDR image is a product of multiplication of the $1/G$ value provided by the first display and the grey level value provided by the second display;
    wherein the grey level value is a grey level value of one of a combined image from two images captured with two different gains and an integrated image formed by at least two areas in the integrated image captured with respective different gains; and
    wherein the gain is one of an effective gain calculated from the two images captured with two different gains and a gain of a corresponding area in the integrated image.

2. The display system of claim 1, wherein the grey level value of the combined image is a weighted average of grey level values of the two images captured with two different gains.

3. The display system of claim 1 further comprising:
    a polarizer;
    a polarizing beam splitter (PBS);
    wherein unpolarized light passes through the polarizer, passes through the first display, is reflected by the PBS, enters and is reflected by the second display, and is transmitted through the PBS in a serial order;
    wherein the first display is a transmissive display comprising:
        a first glass substrate,
        an unpatterned ITO layer,
        a liquid crystal (LC) layer,
        a patterned ITO layer having isolated electrodes, and
        a second glass substrate;
    wherein the LC layer of the first display is configured to rotate the S-polarized light to P-polarized light for a pixel having a lowest grey level value and to remain S-polarized light for a pixel having a highest grey level value;
    wherein the second display is a reflective liquid crystal on silicon (LCOS) comprising:
        a glass substrate,
        an unpatterned ITO layer,
        a LC layer,
        a metal electrode layer, and
        a silicon substrate;
    wherein the LC layer of the second display is configured to rotate the S-polarized light to P-polarized light for a pixel having a highest grey level value and to remain S-polarized light for a pixel having lowest grey level value.

4. The display system of claim 3, whereas the first display displays $1/G$ value.

5. The display system of claim 1 further comprising:
    a polarizer;

a PBS;
wherein unpolarized light is reflected by the PBS, passes through the first display in forward direction, passes through the polarizer, enters and is reflected by the second display, passes through the polarizer for the second time, passes through the first display in backward direction, and is transmitted through the PBS in a serial order;
wherein the first display is a transmissive display comprising:
a first glass substrate,
an unpatterned ITO layer,
a liquid crystal (LC) layer,
a patterned ITO layer having isolated electrodes, and
a second glass substrate;
wherein the LC layer of the first display is configured to rotate the S-polarized light to 45°-polarized light for a pixel having a highest grey level value and to remain S-polarized light for a pixel having a lowest grey level value in forward direction;
wherein the second display is a reflective liquid crystal on silicon (LCOS) comprising:
a glass substrate,
an unpatterned ITO layer,
a LC layer,
a metal electrode layer, and
a silicon substrate;
wherein the LC layer of the second display is configured to rotate the P-polarized light to S-polarized light for a pixel having a lowest grey level value and to remain P-polarized light for a pixel having highest grey level value.

6. The display system of claim 5, whereas the first display displays $1/\sqrt{G}$ value.

7. The display system of claim 1 further comprising:
a first polarizer and a second polarizer;
a beam splitter (BS);
wherein unpolarized light is reflected by the BS, passes through the first polarizer, passes through the first display in forward direction, passes through the second polarizer, enters and is reflected by the second display, passes through the second polarizer for the second time, passes through the first display in backward direction, passes through the first polarizer for second time, and is transmitted through the BS in a serial order;
wherein the first display is a transmissive display comprising:
a first glass substrate,
an unpatterned ITO layer,
a liquid crystal (LC) layer,
a patterned ITO layer having isolated electrodes, and
a second glass substrate;
wherein the LC layer of the first display is configured to rotate the P-polarized light to S-polarized light for a pixel having a lowest grey level value and to remain P-polarized light for a pixel having a highest grey level value in forward direction;
wherein the second display is a reflective liquid crystal on silicon (LCOS) comprising:
a glass substrate,
an unpatterned ITO layer,
a LC layer,
a metal electrode layer, and
a silicon substrate;
wherein the LC layer of the second display is configured to rotate the P-polarized light to S-polarized light for a pixel having a lowest grey level value and to remain P-polarized light for a pixel having highest grey level value.

8. The display system of claim 7, whereas the first display displays $1/\sqrt{G}$ value.

9. The display system of claim 1 further comprising:
a polarizer;
a Faraday rotator;
a PBS;
wherein unpolarized light is reflected by the PBS, passes through the Faraday rotator, passes through the first display in forward direction, passes through the polarizer, enters and is reflected by the second display, passes through the polarizer for the second time, passes through the first display in backward direction, passes through the Faraday rotator for second time, and is transmitted through the PBS in a serial order;
wherein the first display is a transmissive display comprising:
a first glass substrate,
an unpatterned ITO layer,
a liquid crystal (LC) layer,
a patterned ITO layer having isolated electrodes, and
a second glass substrate;
wherein the LC layer of the first display is configured to rotate the 45°-polarized light to −45°-polarized light for a pixel having a lowest grey level value and to remain 45°-polarized light for a pixel having a highest grey level value in forward direction;
wherein the second display is a reflective liquid crystal on silicon (LCOS) comprising:
a glass substrate,
an unpatterned ITO layer,
a LC layer,
a metal electrode layer, and
a silicon substrate;
wherein the LC layer of the second display is configured to rotate the 45°-polarized light to −45°-polarized light for a pixel having a lowest grey level value and to remain 45°-polarized light for a pixel having highest grey level value.

10. The display system of claim 9, whereas the first display displays $1/\sqrt{G}$ value.

11. A display system for displaying a high dynamics range (HDR) image comprising:
a first display for providing a first value; and
a second display for providing a second value;
wherein the displayed image is a product of multiplication of the first value provided by the first display and the second value provided by the second display;
wherein the first display is a transmissive display comprising:
a first glass substrate,
an unpatterned ITO layer,
a liquid crystal (LC) layer,
a patterned ITO layer having isolated electrodes, and
a second glass substrate;
wherein the second display is a reflective liquid crystal on silicon (LCOS) comprising:
a glass substrate,
an unpatterned ITO layer,
a LC layer,
a metal electrode layer, and
a silicon substrate.

12. The display system of claim 11 further comprising:
a polarizer;
a polarizing beam splitter (PBS);

wherein unpolarized light passes through the polarizer, passes through the first display, is reflected by the PBS, enters and is reflected by the second display, and is transmitted through the PBS in a serial order;

wherein the LC layer of the first display is configured to rotate the S-polarized light to P-polarized light for a pixel having a lowest grey level value and to remain S-polarized light for a pixel having a highest grey level value; and wherein the LC layer of the second display is configured to rotate the S-polarized light to P-polarized light for a pixel having a highest grey level value and to remain S-polarized light for a pixel having lowest grey level value.

13. The display system of claim 12, whereas the first display displays the first value.

14. The display system of claim 11 further comprising:
a polarizer;
a PBS;
wherein unpolarized light is reflected by the PBS, passes through the first display in forward direction, passes through the polarizer, enters and is reflected by the second display, passes through the polarizer for the second time, passes through the first display in backward direction, and is transmitted through the PBS in a serial order;

wherein the LC layer of the first display is configured to rotate the S-polarized light to 45°-polarized light for a pixel having a highest grey level value and to remain S-polarized light for a pixel having a lowest grey level value in forward direction; and wherein the LC layer of the second display is configured to rotate the P-polarized light to S-polarized light for a pixel having a lowest grey level value and to remain P-polarized light for a pixel having highest grey level value.

15. The display system of claim 14, whereas the first display displays the square root of the first value.

16. The display system of claim 11 further comprising:
a first polarizer and a second polarizer;
a beam splitter (BS);
wherein unpolarized light is reflected by the BS, passes through the first polarizer, passes through the first display in forward direction, passes through the second polarizer, enters and is reflected by the second display, passes through the second polarizer for the second time, passes through the first display in backward direction, passes through the first polarizer for second time, and is transmitted through the BS in a serial order;

wherein the LC layer of the first display is configured to rotate the P-polarized light to S-polarized light for a pixel having a lowest grey level value and to remain P-polarized light for a pixel having a highest grey level value in forward direction; and wherein the LC layer of the second display is configured to rotate the P-polarized light to S-polarized light for a pixel having a lowest grey level value and to remain P-polarized light for a pixel having highest grey level value.

17. The display system of claim 16, whereas the first display displays the square root of the first value.

18. The display system of claim 11 further comprising:
a polarizer;
a Faraday rotator;
a PBS;
wherein unpolarized light is reflected by the PBS, passes through the Faraday rotator, passes through the first display in forward direction, passes through the polarizer, enters and is reflected by the second display, passes through the polarizer for the second time, passes through the first display in backward direction, passes through the Faraday rotator for second time, and is transmitted through the PBS in a serial order;

wherein the LC layer of the first display is configured to rotate the 45°-polarized light to −45°-polarized light for a pixel having a lowest grey level value and to remain 45°-polarized light for a pixel having a highest grey level value in forward direction; and wherein the LC layer of the second display is configured to rotate the 45°-polarized light to −45°-polarized light for a pixel having a lowest grey level value and to remain 45°-polarized light for a pixel having highest grey level value.

19. The display system of claim 18, whereas the first display displays the square root of the first value.

20. A method for displaying a high dynamics range (HDR) image comprising:
providing a 1/G value using a first display, wherein G is a gain; and
providing a grey level value using a second display;
displaying the HDR image, wherein the HDR image is a product of multiplication of the 1/G value provided by the first display and the grey level value provided by the second display;
wherein the grey level value is a grey level value of one of a combined image from two images captured with two different gains and an integrated image formed by at least two areas in the integrated image captured with respective different gains;
wherein the gain is one of an effective gain calculated from the two images captured with two different gains and a gain of a corresponding area in the integrated image; and
wherein the grey level value of the combined image is a weighted average of grey level values of the two images captured with two different gains.

* * * * *